(12) United States Patent
Leiber et al.

(10) Patent No.: US 12,240,434 B2
(45) Date of Patent: Mar. 4, 2025

(54) BRAKE SYSTEM WITH AT LEAST TWO HYDRAULIC CIRCUITS AND AT LEAST TWO PRESSURE SUPPLY DEVICES

(71) Applicant: IPGATE AG, Pfäffikon (CH)

(72) Inventors: Heinz Leiber, Oberriexingen (DE); Anton Van Zanten, Ditzingen (DE)

(73) Assignee: IPGATE AG, Pfäffikon (CH)

( * ) Notice: Subject to any disclaimer, the term of this patent is extended or adjusted under 35 U.S.C. 154(b) by 649 days.

(21) Appl. No.: 17/429,380

(22) PCT Filed: Jul. 10, 2019

(86) PCT No.: PCT/EP2019/068592
§ 371 (c)(1),
(2) Date: Aug. 9, 2021

(87) PCT Pub. No.: WO2020/164754
PCT Pub. Date: Aug. 20, 2020

(65) Prior Publication Data
US 2022/0126802 A1 Apr. 28, 2022

(30) Foreign Application Priority Data
Feb. 12, 2019 (DE) .................... 20 2019 101 596.9

(51) Int. Cl.
*B60T 8/32* (2006.01)
*B60T 8/40* (2006.01)
(Continued)

(52) U.S. Cl.
CPC .............. *B60T 8/326* (2013.01); *B60T 8/40* (2013.01); *B60T 8/4022* (2013.01);
(Continued)

(58) Field of Classification Search
CPC ........ B60T 8/4022; B60T 8/4054; B60T 8/40; B60T 8/326; B60T 8/4081; B60T 13/142;
(Continued)

(56) References Cited

U.S. PATENT DOCUMENTS 5,588,718 A 12/1996 Winner et al.
5,986,368 A 11/1999 Wetzel et al.
(Continued)

FOREIGN PATENT DOCUMENTS

CN 101039829 A 9/2007
CN 101341056 A 1/2009
(Continued)

OTHER PUBLICATIONS

WO document No. 2017/148968 to Besier et al published on Sep. 8, 2017.*
(Continued)

*Primary Examiner* — Pamela Rodriguez
(74) *Attorney, Agent, or Firm* — Panitch Schwarze Belisario & Nadel LLP (57) ABSTRACT

A brake system may include: two hydraulic brake circuits, each having at least one wheel brake; a first pressure supply device for pressure build-up and release in at least one brake circuit via forward and return travel of a piston; a second pressure supply device with a continuous delivery, electromotively-driven piston pump, gear pump, or eccentric piston pump; at least one valve assembly with valves for adjusting pressure for each wheel brake and/or for connecting/disconnecting the wheel brakes and at least one of the pressure supply devices; at least one electronic control unit; a connection line connecting the two brake circuits; and at least one outlet valve for pressure release. The wheel brakes are paired with dedicated switch valves. Each brake circuit has a hydraulic main line to connect the switch valves to the first
(Continued)

and second pressure supply devices, which provide different maximum pressures and/or delivery volumes.

21 Claims, 7 Drawing Sheets

(51) Int. Cl.
| | |
|---|---|
| *B60T 13/14* | (2006.01) |
| *B60T 13/68* | (2006.01) |
| *F15B 11/17* | (2006.01) |
| *F15B 11/22* | (2006.01) |
| *F15B 13/02* | (2006.01) |
| *F15B 13/06* | (2006.01) |

(52) U.S. Cl.
CPC .......... *B60T 8/4054* (2013.01); *B60T 8/4081* (2013.01); *B60T 13/686* (2013.01); *F15B 11/17* (2013.01); *F15B 11/22* (2013.01); *F15B 13/025* (2013.01); *F15B 13/06* (2013.01); *B60T 13/142* (2013.01); *B60T 2270/402* (2013.01)

(58) Field of Classification Search
CPC .. B60T 13/686; B60T 2270/402; F15B 11/17; F15B 11/22; F15B 13/025; F15B 13/06
See application file for complete search history.

(56) References Cited

U.S. PATENT DOCUMENTS

| | | | |
|---|---|---|---|
| 5,988,767 A | 11/1999 | Inoue et al. | |
| 6,042,200 A | 3/2000 | Hosoya et al. | |
| 6,517,170 B1 | 2/2003 | Hofsaess et al. | |
| 9,776,604 B2 | 10/2017 | Lee et al. | |
| 10,173,659 B2 | 1/2019 | Kim et al. | |
| 10,513,249 B2 | 12/2019 | Kim | |
| 10,688,979 B2 | 6/2020 | Leiber et al. | |
| 11,554,765 B2 | 1/2023 | Leiber et al. | |
| 11,565,678 B2 | 1/2023 | Zander et al. | |
| 2008/0246334 A1 | 10/2008 | Drescher | |
| 2009/0115247 A1 | 5/2009 | Leiber et al. | |
| 2010/0001577 A1 | 1/2010 | Hatano | |
| 2012/0235469 A1 | 9/2012 | Miyazaki et al. | |
| 2013/0103277 A1 | 4/2013 | Attallah et al. | |
| 2013/0213025 A1 | 8/2013 | Linden | |
| 2014/0203626 A1 | 7/2014 | Biller et al. | |
| 2014/0216866 A1 | 8/2014 | Feigel et al. | |
| 2015/0203085 A1 | 7/2015 | Maruo et al. | |
| 2015/0283987 A1 | 10/2015 | Bareiss | |
| 2016/0009263 A1 | 1/2016 | Feigel et al. | |
| 2016/0009267 A1 | 1/2016 | Lesinski, Jr. | |
| 2016/0023644 A1 | 1/2016 | Feigel et al. | |
| 2016/0107629 A1 | 4/2016 | Han | |
| 2016/0185329 A1 | 6/2016 | Lee et al. | |
| 2016/0221562 A1 | 8/2016 | Leiber et al. | |
| 2016/0311422 A1 | 10/2016 | van Zanten et al. | |
| 2016/0375886 A1 | 12/2016 | Jung | |
| 2017/0015293 A1 | 1/2017 | Yagashira et al. | |
| 2017/0106843 A1 | 4/2017 | Jeong | |
| 2017/0158184 A1 | 6/2017 | Choi et al. | |
| 2017/0182988 A1 | 6/2017 | Kawakami et al. | |
| 2017/0327098 A1* | 11/2017 | Leiber ................... | B60T 13/745 |
| 2017/0334417 A1 | 11/2017 | Choi et al. | |
| 2017/0361825 A1 | 12/2017 | Drumm et al. | |
| 2018/0065605 A1 | 3/2018 | Leiber et al. | |
| 2018/0065609 A1 | 3/2018 | Leiber et al. | |
| 2018/0126970 A1 | 5/2018 | Leiber et al. | |
| 2018/0215366 A1 | 8/2018 | Leiber et al. | |
| 2018/0334149 A1 | 11/2018 | Feigel | |
| 2019/0031165 A1 | 1/2019 | Besier et al. | |
| 2019/0100182 A1 | 4/2019 | Leiber et al. | |
| 2019/0344769 A1 | 11/2019 | Zimmermann et al. | |
| 2020/0047731 A1 | 2/2020 | Reuter | |
| 2020/0079335 A1 | 3/2020 | Linhoff et al. | |
| 2020/0079338 A1 | 3/2020 | Roh | |
| 2020/0139948 A1 | 5/2020 | Leiber et al. | |
| 2020/0139949 A1 | 5/2020 | Dolmaya et al. | |
| 2020/0172068 A1 | 6/2020 | Leiber et al. | |
| 2020/0406880 A1 | 12/2020 | Zimmermann et al. | |
| 2021/0053540 A1 | 2/2021 | Besier et al. | |
| 2021/0094524 A1 | 4/2021 | Wetzel | |
| 2021/0179051 A1 | 6/2021 | Alford et al. | |
| 2021/0245725 A1 | 8/2021 | Courth et al. | |
| 2021/0309197 A1 | 10/2021 | Weh et al. | |
| 2022/0041150 A1 | 2/2022 | Leiber | |
| 2022/0135013 A1 | 5/2022 | Leiber et al. | |
| 2022/0314813 A1 | 10/2022 | Koglsperger et al. | |
| 2023/0356700 A1 | 11/2023 | Jia et al. | |
| 2024/0001899 A1 | 1/2024 | Stanojkovski | |

FOREIGN PATENT DOCUMENTS

| | | | |
|---|---|---|---|
| CN | 101987616 A | 3/2011 | |
| CN | 102414063 A | 4/2012 | |
| CN | 102616229 A | 8/2012 | |
| CN | 102639370 A | 8/2012 | |
| CN | 102822025 A | 12/2012 | |
| CN | 103253251 A | 8/2013 | |
| CN | 103318160 A | 9/2013 | |
| CN | 103347754 A | 10/2013 | |
| CN | 103874609 A | 6/2014 | |
| CN | 104640755 A | 5/2015 | |
| CN | 107107885 A | 8/2017 | |
| CN | 107428325 A | 12/2017 | |
| CN | 107472232 A | 12/2017 | |
| DE | 4340467 A1 | 6/1995 | |
| DE | 19914403 A1 | 10/2000 | |
| DE | 10025038 A1 | 11/2001 | |
| DE | 10028092 A1 | 12/2001 | |
| DE | 10158065 A1 | 6/2003 | |
| DE | 10259489 A1 | 7/2004 | |
| DE | 10319338 A1 | 11/2004 | |
| DE | 102005017958 A1 | 4/2006 | |
| DE | 102005055751 A1 | 11/2006 | |
| DE | 102007016948 B3 | 8/2008 | |
| DE | 102008015241 A1 | 9/2008 | |
| DE | 102009008944 A1 | 8/2010 | |
| DE | 102009055721 A1 | 6/2011 | |
| DE | 102011086258 A1 | 5/2012 | |
| DE | 102012210809 A1 | 1/2013 | |
| DE | 102012213216 A1 | 2/2013 | |
| DE | 102012217825 A1 | 4/2014 | |
| DE | 102012025290 A1 | 6/2014 | |
| DE | 102013217954 A1 | 3/2015 | |
| DE | 102013017205 A1 | 4/2015 | |
| DE | 102013224783 A1 | 6/2015 | |
| DE | 112013004634 T5 | 6/2015 | |
| DE | 102014225962 A1 | 6/2016 | |
| DE | 202015008975 U1 | 6/2016 | |
| DE | 102015103858 A1 | 9/2016 | |
| DE | 102015104246 A1 | 9/2016 | |
| DE | 112015002162 T5 | 1/2017 | |
| DE | 102016222765 A1 | 5/2017 | |
| DE | 102016105232 A1 | 9/2017 | |
| DE | 102016203563 A1 | 9/2017 | |
| DE | 102017219257 A1 | 4/2018 | |
| DE | 102016225537 A1 | 6/2018 | |
| DE | 102017200955 A1 | 7/2018 | |
| DE | 102017219598 A1 | 7/2018 | |
| DE | 102017222435 A1 | 7/2018 | |
| DE | 102017222450 A1 | 7/2018 | |
| DE | 102017207954 A1 | 11/2018 | |
| DE | 102017113563 A1 | 12/2018 | |
| DE | 102017212016 A1 | 1/2019 | |
| DE | 102018111126 A1 | 11/2019 | |
| DE | 102019219158 A1 | 6/2021 | |
| EP | 280740 A1 | 9/1988 | |
| EP | 2881292 A1 | 6/2015 | |
| EP | 2883766 A1 | 6/2015 | |
| EP | 2744691 B1 | 7/2015 | |
| EP | 3225480 A1 | 10/2017 | |
| EP | 3225481 A1 | 10/2017 | |

(56) References Cited

FOREIGN PATENT DOCUMENTS

| | | |
|---|---|---|
| EP | 3333031 A1 | 6/2018 |
| GB | 689075 A | 6/1947 |
| GB | 8514135 | 7/1985 |
| GB | 2160273 A | 12/1985 |
| GB | 8703148 | 2/1987 |
| GB | 2186932 A | 8/1987 |
| JP | H8-506301 A | 7/1996 |
| JP | H8282459 A | 10/1996 |
| JP | H10329699 A | 12/1998 |
| JP | H11-348751 A | 12/1999 |
| JP | 2001097201 A | 4/2001 |
| JP | 2001219845 A | 8/2001 |
| JP | 20020337679 A | 11/2002 |
| JP | 2002541010 A | 12/2002 |
| JP | 2006-151342 A | 6/2006 |
| JP | 2013541462 A | 11/2013 |
| KR | 20090077182 A | 7/2009 |
| KR | 20170012348 A | 2/2017 |
| WO | 2006111393 A1 | 10/2006 |
| WO | 2012034661 A1 | 3/2012 |
| WO | 2012059175 A1 | 5/2012 |
| WO | 2012146461 A1 | 11/2012 |
| WO | 2013010554 A1 | 1/2013 |
| WO | 2013037568 A1 | 3/2013 |
| WO | 2014135446 A2 | 9/2014 |
| WO | 2015024795 A1 | 2/2015 |
| WO | 2015032637 A1 | 3/2015 |
| WO | 2015106892 A1 | 7/2015 |
| WO | 2016012331 A1 | 1/2016 |
| WO | 2016023994 A1 | 2/2016 |
| WO | 2016023995 A1 | 2/2016 |
| WO | 2016120292 A1 | 8/2016 |
| WO | 2016146223 A2 | 9/2016 |
| WO | 2017055152 A1 | 4/2017 |
| WO | 2017148968 A1 | 9/2017 |
| WO | 2017153072 A1 | 9/2017 |
| WO | 2018011021 A1 | 1/2018 |
| WO | 2018019671 A1 | 2/2018 |
| WO | 2018130406 A1 | 7/2018 |
| WO | 2018130482 A1 | 7/2018 |
| WO | 2018130483 A1 | 7/2018 |
| WO | 2018210534 A1 | 11/2018 |
| WO | 2018234387 A1 | 12/2018 |
| WO | 2019002475 A1 | 1/2019 |
| WO | 2019215283 A1 | 11/2019 |

OTHER PUBLICATIONS

WO document No. 2018/130482 to Biller et al published on Jul. 19, 2018.*
Translation of WO document No. 2015/106892 to Linhoff et al obtained from website: https://worldwide.espacenet.com on May 28, 2024.*
Translation of German Patent No. DE 102012210809 to Strecker et al obtained from website: https://worldwide.espacenet.com on May 28, 2024.*
Int'l Search Report and Written Opinion issued Oct. 22, 2019 in Int'l Application No. PCT/EP2019/068596, English translation of Int'l Search Report only.
Int'l Search Report and Written Opinion issued Oct. 30, 2019 in Int'l Application No. PCT/EP2019/057123, English translation of Int'l Search Report only.
Int'l Search Report and Written Opinion issued Nov. 4, 2019 in Int'l Application No. PCT/EP2019/068592, English translation of Int'l Search Report only.
Int'l Search Report and Written Opinion issued Apr. 1, 2020 in Int'l Application No. PCT/EP2020/053626, English translation of Int'l Search Report only.
Int'l Search Report and Written Opinion issued Apr. 28, 2020 in Int'l Application No. PCT/EP2020/053609, English translation of Int'l Search Report only.
Int'l Search Report and Written Opinion issued Apr. 28, 2020 in Int'l Application No. PCT/EP2020/053613, English translation of Int'l Search Report only.
Int'l Search Report and Written Opinion issued May 19, 2020 in Int'l Application No. PCT/EP2020/053665, English translation of Int'l Search Report only.
Int'l Search Report and Written Opinion issued May 19, 2020 in Int'l Application No. PCT/EP2020/053668, English translation of Int'l Search Report only.
Int'l Search Report and Written Opinion issued Jun. 5, 2020 in Int'l Application No. PCT/EP2020/053667, English translation of Int'l Search Report only.
Int'l Search Report and Written Opinion issued Oct. 9, 2020 in Int'l Application No. PCT/EP2020/053666, English translation of Int'l Search Report only.
Search Report issued Jan. 3, 2020 in DE Application No. 10 2019 103 483.3.
Search Report issued Apr. 2, 2020 in DE Application No. 10 2019 107 334.0.
Search Report issued Dec. 20, 2019 in DE Application No. 10 2019 103 464.7.
Office Action issued Dec. 28, 2023 in U.S. Appl. No. 17/429,593.
Office Action issued Oct. 24, 2023 in U.S. Appl. No. 17/426,615.
Notice of Allowance issued Jan. 24, 2024 in U.S. Appl. No. 17/429,608.
Corrected Notice of Allowance issued Feb. 1, 2024 in U.S. Appl. No. 17/429,608.
Office Action issued Mar. 16, 2022 in U.S. Appl. No. 17/429,620.
Office Action issued Jan. 25, 2024 n European Aplication No. 20706153.2-1012 with English Translation.
Office Action issued Feb. 29, 2024 in U.S. Appl. No. 17/429,423.
Office Action issued Nov. 24, 2023 in U.S. Appl. No. 17/429,562.
Notice of Allowance issued Mar. 6, 2024 in U.S. Appl. No. 17/429,615.
Office Action issued Dec. 7, 2023 in U.S. Appl. No. 17/429,578.
Office Action issued Mar. 12, 2024 in JP Application No. 2021-547137 with English Translation.
Office Action (First Examination Report) issued on Feb. 17, 2023, by the Intellectual Property India in corresponding India Patent Application No. 202117038290 with English Translation.
Office Action issued May 16, 2023 in Chinese Application No. 202080021255.X with English Translation.
Office Action issued May 17, 2023 in Chinese Application No. 202080021265.3 with English Translation.
Office Action issued May 22, 2023 in Chinese Application No. 202080022277.8 with English Translation.
Office Action issued Apr. 20, 2023 in European Aplication No. 19714344.9-1012 with English Translation.
Office Action issued Mar. 28, 2023 in Japanese Aplication No. 2021-547138 with English Translation.
Office Action issued Mar. 14, 2024 in U.S. Appl. No. 17/429,562.
Office Action issued Mar. 28, 2024 in U.S. Appl. No. 17/429,527.
Office Action issued Mar. 14, 2024 in U.S. Appl. No. 17/429,578.
Notice of Allowance issued Mar. 27, 2024 in U.S. Appl. No. 17/429,608.
Office Action issued Feb. 15, 2024 in European Application No. 19 742 145.6-1012 with English translation.
Office Action issued Aug. 5, 2024 in U.S. Appl. No. 17/429,403.
Notice of Allowance issued Aug. 21, 2024, in U.S. Appl. No. 17/429,593.
Office Action issued Apr. 2, 2024 in JP Application No. 2021-547135 with English Translation.
Office Action issued Mar. 12, 2024 in JP Application No. 2021-547136 with English Translation.

* cited by examiner

BRAKE SYSTEM WITH AT LEAST TWO HYDRAULIC CIRCUITS AND AT LEAST TWO PRESSURE SUPPLY DEVICES

CROSS-REFERENCE TO RELATED APPLICATION

This application is a Section 371 of International Application No. PCT/EP2019/068592, filed Jul. 10, 2019, which was published in the German language on Aug. 20, 2020 under International Publication No. WO 2020/164754 A1, which claims priority under 35 U.S.C. § 119(b) to German Patent Application No. 20 2019 101 596.9, filed Feb. 12, 2019, the disclosures of which are incorporated herein by reference.

The present invention relates to a brake system having the features of one or more of the accompanying claims.

PRIOR ART

The requirements, in particular safety requirements, for semi-automated (SAD) and fully automated (FAD) driving have a major influence on the system configuration. These require redundant and partially redundant systems and components.

The focus here is on the pressure supply, with which the braking force or the pressure build-up must be ensured even without a driver's foot. The electronic controller must correspondingly also be configured for this function. For level 3, in particular level 4, the ABS function must likewise be ensured even in the event of a fault.

With a redundant pressure supply, it is also possible to implement a system concept without tandem master cylinder HZ, only with a so-called electric pedal, or, for level 5, only with a brake switch. Here, the following patent applications are of note: DE 10 2017 222 450 discloses a hydraulic system with only one master cylinder, a redundant pressure supply, isolation valves to the master cylinder, and a travel simulator. A bypass valve between the two brake circuits allows a supply to both brake circuits in the event of a pressure supply failure of the second pressure supply. This valve, which is open when electrically deenergized, is extremely relevant to safety, because a failure of the valve and for example of a brake circuit can result in a total brake failure. Furthermore, the expenditure on valves is very high.

DE 10 2017 222 435 and DE 10 2016 225 537 present a similar concept, but with an electric pedal, reduced pressure supply and bypass valve. All systems use a so-called outlet valve for the ABS function during the pressure reduction. If, upon the opening of the valve, a dirt particle enters the valve seat thereof, this can cause a brake circuit failure during the next braking operation.

DE 10 2017 207 954 presents a system concept with redundant pressure supply and without outlet valves for the closed-loop ABS pressure control. The so-called multiplex method described in DE 102005055751 is used here, in which the pressure control for ABS is performed from the pressure supply by means of volume measurement and pressure information. Here, the switching valves for the pressure control are also used redundantly. A safety risk arises if the piston seal or a check valve to the reservoir fails and the switching valve is leaking owing to dirt particles, which likewise results in a total brake failure.

The abovementioned examples demonstrate the problem of dormant faults, which become critical in the case of double faults if these cannot be detected by the diagnosis before the braking maneuver.

OBJECT OF THE INVENTION

The object addressed by the invention is that of providing an inexpensive hydraulic system with two brake circuits.

ACHIEVEMENT OF THE OBJECT

Said object and further advantages may be achieved by means of a brake system according to one or more of the accompanying claims.

ADVANTAGES OF THE INVENTION

According to the invention, the first and the second pressure supply device are designed for different maximum pressures or pressure levels and/or different delivery volumes.

If one pressure supply device is an electromotively driven plunger piston and the other pressure supply device is, for example, a simple piston or gear pump, downsizing of the pressure supply device in order to save costs is possible by virtue of the motor of the plunger pump being designed only for the locking pressure in the presence of high $\mu$, for example 120 bar, and the simple piston or gear pump being designed for example for 200 bar. Furthermore, in a further embodiment, it is also optionally possible for the plunger pump to be combined with a brushless motor and for the piston pump, as in the case of ABS/ESP, to be combined with a brush-type motor.

If two pressure supply devices are provided, a pressure can be built up by means of one pressure supply, whilst at the same time the pressure is reduced by means of the second pressure supply. Furthermore, both pressure supply devices may be connected in parallel or together by means of the two connecting valves for a rapid pressure build-up. This advantageously allows downsizing of the drives. Also, in this way, the pressure difference owing to the back pressure of the connecting valves can advantageously be reduced. The plunger piston may advantageously likewise have redundant seals, which can also be checked for leak-tightness. The pressure supply device may likewise be provided with a second monitorable check valve. Instead of two pressure supplies, a plunger pump with an electrically redundant motor with 2×3-phase winding may also be used in the valve arrangement according to the invention for the purposes of connecting the two brake circuits. This motor may also be combined with a drive and double-action piston.

Through the provision of two connecting switching valves connected in series for the purposes of connecting two brake circuits of the brake system according to the invention, a high level of fail safety is advantageously achieved.

Here, in a first alternative, to improve the fail safety, the invention provides that the two connecting switching valves, which are open when electrically energized and which are designed in particular as 2/2 directional valves, are arranged with their valve connections in the brake system such that, in the electrically deenergized state, they open in a manner assisted by a pressure possibly prevailing in the respective hydraulic main line or the brake circuit. This can be achieved in particular in that the valve connection, assigned to the valve seat, of a connecting switching valve is hydraulically connected to a hydraulic main line, such that the pressure prevailing there pushes the valve control element away from the valve seat. As an alternative to or in combination with the first alternative, the inner section of the connecting line, which connects the two connections of the connecting switching valves directly to one another, may be connected to the pressure chamber of a master brake cylinder via a further hydraulic line, wherein at least one valve is arranged in the further hydraulic line for the purposes of selectively shutting off the latter. In this way, it is advantageously possible that, in the event of a fault, a pressure can be built up in one or both brake circuits by means of the master brake cylinder, which is actuatable for example by means of a brake pedal.

The hydraulic system according to the invention may thus have a pressure supply device for each brake circuit. It is however likewise possible that only a single pressure supply device is provided for both brake circuits, without the functionality of the hydraulic system becoming significantly more susceptible to faults as a result. Redundancy is created through the series connection of the two connecting valves. The valves can additionally be checked with regard to leak-tightness and switching function. An extremely high level of fail safety is thus achieved.

The master brake cylinder with travel simulator should likewise be fail-safe, which may be realized for example by means of redundant seals, the failure of which can be monitored. This advantageously makes it possible to omit a complex, large and expensive tandem master brake cylinder, and to use only one master brake cylinder with one pressure chamber.

If the hydraulic system according to the invention is used as a brake system, the pedal movement may be measured, again redundantly, by means of two redundant pedal travel sensors or at least the master sensor. The pedal travel sensors may preferably be coupled to a force-travel element, as is known for example from WO/2012/059175 A1, for fault detection, for example of the travel simulator.

The connecting valve from the master brake cylinder to the brake circuits and the pressure supply is likewise relevant to safety, because a failure allows a connection to the pressure supply, which has an effect on the pedal and changes the pedal characteristic. This connection is also safeguarded by means of the abovementioned valve arrangement for connecting the two brake circuits, because this results in a redundant series connection of two valves between each pressure supply and the master brake cylinder, such that, in the event of failure of one of the valves, it is still the case that no undesired reaction is imparted to the pedal.

The multiplex method (MUX), that is to say the setting, or setting by closed-loop control, of the pressure build-up and pressure reduction in a wheel brake by means of a switching valve assigned to or connected immediately upstream of the wheel brake, may advantageously be implemented, in the case of which the pressure supply sets the pressure in the wheel brake with the switching valve open. Additional outlet valves for the wheel brakes, such as are used in the classic ABS system, can advantageously be omitted here. It is however also possible to provide one outlet valve or discharge valve for each brake circuit, or else only one discharge valve for both brake circuits, for the pressure reduction. If two redundant pressure supplies, for example with plunger and piston pump, are provided, the abovementioned multiplex method may be implemented with both pressure supply devices simultaneously or separately in one or both brake circuits.

In the known MUX method, pressure is generated by means of a central electromotive piston unit and, with this, in interaction with one valve per wheel, the pressure modulation $P_{build-up}$ and $P_{reduction}$ for ABS is generated. Here, four wheel cylinders=channels must be operated. By means of a pressure-volume characteristic curve, the change in volume generated by the piston can generate the corresponding wheel pressure/pressure change. Here, $P_{build-up}$ and $P_{reduction}$ cannot be generated in the system simultaneously. However, the $P_{reduction}$ should take place with only a short delay, wherein the switching time has an adverse effect on the pressure change $P_{build-up}$ and $P_{reduction}$.

If two pressure supply devices are provided, these each only have to perform the closed-loop pressure control for the components, in particular wheel brakes, provided in the brake circuit assigned to them, or brake circuit. That is to say, the multiplex method only has to be configured for two channels or wheel brakes. Only in the event of a fault does the MUX method have to be implemented, by means of the connection of the two brake circuits, by one pressure supply device for all wheel brakes.

If at least one discharge valve is also provided for the pressure reduction, the hydraulic system according to the invention can also be operated only with a single pressure supply device, because then a simultaneous pressure build-up in one brake circuit by means of the pressure supply device, and a pressure reduction in the other brake circuit by dissipation via the discharge valve to a reservoir, can be performed.

The electronic open-loop and closed-loop control device may be of fully or partially redundant configuration, also with a corresponding on-board electrical system connection, for the various functions. In particular, the control of the valves may be of redundant configuration with isolation switches for the individual valve drivers, in order that, in every fault situation, for example a short circuit of a driver, fail-safe control is possible.

The level sensor in the reservoir should measure the level continuously, in order that a leak is identified at an early point in time from a change in level. This sensor may also be of redundant design, which is easy to implement if the electronic open-loop and closed-loop control device lies against the reservoir and into the sensor elements can be arranged on the circuit board.

The fault analysis shows that double faults, in some cases even triple faults, are advantageously managed without a total failure of the hydraulic system or of the brake. Here, the diagnosis of individual faults is substantially possible in order to identify dormant faults.

In the case of a pressure supply device of redundant configuration, the probability of failure of the entire pressure supply is extremely low, and is actually only relevant in the event of an on-board electrical system failure. This means that a redundant tandem master brake cylinder (THZ) can be omitted. Nevertheless, in the case of the concept according to the invention, a master brake cylinder with checkable redundant seals and with only one pressure chamber is proposed, which hereby has increased fail safety and is thus on a par with a tandem master brake cylinder.

With this fail-safe valve arrangement, the number of valves can be reduced by approximately 40% in relation to a valve arrangement of known integrated 1-box systems, which, with higher expenditure on valves, are not yet more failsafe. Also, only 50% of the valve variants are necessary in relation to the abovementioned 1-box systems.

In the case of one of the two pressure supply devices, it is expedient to use the motor-driven pump of the ABS and ESP, which has advantages in terms of both installation space and costs.

As is known, the parking brake EPB can be assisted in the immobilizing of the brake, in order to reduce the size of the electric motor of the parking brake.

With the redundant pressure supply devices, this is even more effective and safer.

With the hydraulic system according to the invention, it is advantageously ensured that the braking action, the ABS function and the pedal characteristic are ensured, and sufficiently fail-safe, by way of components or assemblies and valve circuits of redundant configuration.

Various possible embodiments of the invention will be discussed in more detail below with reference to drawings.

In the drawings.

Figure 1:
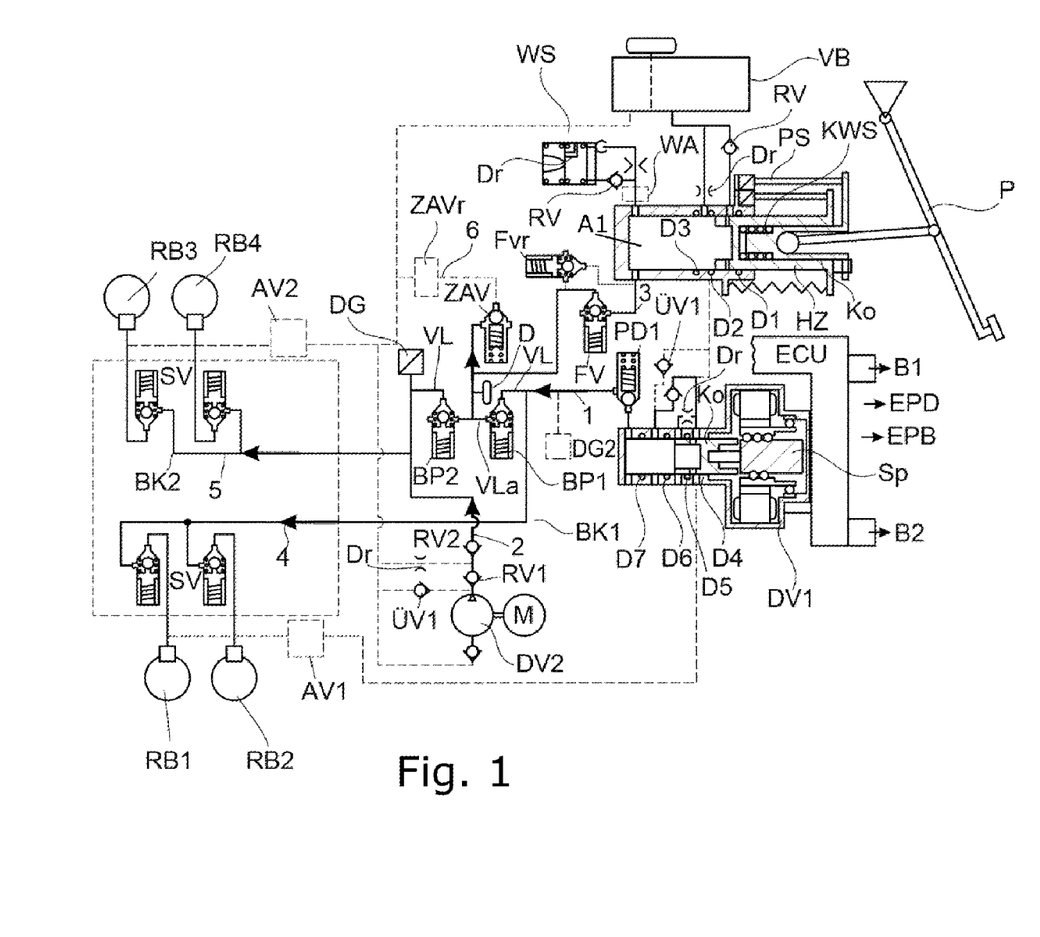
FIG. 1: shows a first possible embodiment of a hydraulic system according to the invention with a fail-safe valve arrangement for connecting the two brake circuits, with a master cylinder with an actuating device, and with two pressure supply devices with an electronic open-loop and closed-loop control device, as a so-called integrated 1-box system.

FIG. 1 shows the basic elements of a closed-loop-controllable brake system composed of master brake cylinder HZ with travel simulator WS and reservoir VB, and two pressure supply devices DV1 and DV2, wherein the pressure supply device DV1 has electromotive piston control and the second pressure supply device DV2 has a simple 1-circuit piston or gear pump. Both act together with a valve circuit on the wheel brake cylinders RZ, which transmit the closed-loop-controlled wheel pressure, for example in the case of ABS, to the brake. This corresponds to the prior art. It is however the intention for the hydraulic system according to the invention to have a high level of fail safety for semi-automatic (SAD) or fully automatic driving (FAD).

For this purpose, all failure-relevant components should be taken into consideration, such as valves, sensors, seals, motors and brake circuits. The following components or hydraulic connections should therefore advantageously be designed to be fail-safe:

(1) connection from the pressure supply device DV1 provided for the first brake circuit to the second brake circuit BK2;

(2) connection from the pressure supply device DV2 provided for the first brake circuit to the first brake circuit BK1;

(3) connection from the pressure chamber of the master brake cylinder HZ via the valve FV to the brake circuits BK1, BK2 via the valves BP1 and BP2;

(4) connection of valve PD1 and valve BD1 to the wheel brake cylinders RZ via the respective switching valves SV assigned to the wheel brakes;

(5) connection of valve BD2 to the wheel brake cylinders RZ via the respective switching valves SV assigned to the wheel brakes;

(6) connection from a brake circuit BK1, BK2 to the reservoir VB;

(7) connections between brake circuits BK1, BK2 to the wheel brake cylinders RZ.

These hydraulic connections, with possible failure-inducing faults of the individual components, will be described below.

The pressure supply device DV1 acts from the brake circuit BK1 into the brake circuit BK2 via the hydraulic lines line 1, 2 and 5 via the switching valves SV to the wheel brakes RB. In the prior art, only a single bypass valve is used for this purpose. Here, a valve failure can cause a total brake failure if there is also a dormant fault in a further valve. The invention therefore provides two redundant valves BP1 and BP2 in order to allow the connection to the brake circuit BK2 from the first pressure supply device DV1. Dormant faults of the valves BP1 and BP2 are identified by the pressure transducer by virtue of the valves being short-circuited in the event of a change in pressure. In this phase, the pressure must remain constant. In the event of failure of the first pressure supply device DV1, for example in the event of failure of a piston seal, the imparting of a reaction to the brake circuit BK2 via the three redundant valves BP1, BP2 and PD1 is prevented. The valves are preferably valves which are open when electrically deenergized, in order that, in the event of failure of the pressure supply devices DV1, DV2, the master brake cylinder HZ can act on both brake circuits BK1 and BK2. If the pressure is reduced by way of the opening of the valves ZAV or FV, the two connecting switching valves open automatically, without dedicated electrical actuation thereof, owing to the acting pressure difference.

Correspondingly, the pressure supply device DV2 in the second brake circuit BK2 acts via the hydraulic lines 2 and 5 and via the valves BP2 and BP1 into the hydraulic line 4, and from there via the switching valves SV to the wheel cylinders RZ. In the event of failure of the brake circuit BK in wheel brakes RB, the valves SV, BP1 and BP2 are closed in advance by diagnosis, and prevent a failure of the pressure supply. Here, all valves, for example SV, BP1, BP2, are to be regarded as safety-critical with regard to dormant faults, because the hydraulic medium flowing through the valves contains dirt particles that can prevent a closure of the valve, and the valves therefore leak. In the present case, for example in the event of failure of one switching valve SV, one brake circuit may duly fail. The other brake circuit is however safeguarded by the interconnection of the two valves BP1 and BP2. There would have to be a triple fault here, that is to say both valves BP1 and BP2 would additionally have to fail, for a total failure to occur. At least one brake circuit is thus reliably protected against double faults and prevents a total brake failure. Safety with respect to double faults, if dormant faults can occur, is a crucial safety feature for SAD and FAD. This also includes maintaining the pressure supply or the brake booster in the event of a brake circuit failure.

Here, the pressure supply device DV2 can assist the other pressure supply device DV1 in the case of a rapid pressure build-up or a pressure build-up above 120 bar, and/or can perform the pressure supply in the event of fading by means of continuous delivery and/or for the ABS function, and/or, in the event of failure of the other pressure supply DV1, can jointly perform the function thereof.

It is likewise possible that the pressure supply device DV1 performs the pressure build-up for pressure ranges lower than or equal to 120 bar and for the ABS function. In the event of failure of the pressure supply device DV2, if the pressure supply device DV2 is designed only for a maximum pressure of 120 bar, only this maximum pressure of 120 bar is available for both brake circuits.

With the connecting valves BP1 and/or BP2 closed, the two pressure supply devices DV1 and DV2 can set, or set by closed-loop control, the pressure in their brake circuits BK1 and BK2 independently of one another.

The pedal movement is measured by means of redundant pedal travel sensors (PS), which at the same time act on a force-travel sensor (KWS) measuring element according to WO2012/059175 A1. The pressure supply device DV1 is controlled with the signal from the pedal travel sensors, wherein the piston control causes the volume flow in the hydraulic main line 1 in the brake circuit BK1 and via the redundant valves BP1 and BP2 into the brake circuit BK2. The pressure supply device DV1 may be designed so as to act only up to the locking pressure for example 120 bar. Higher pressures are then delivered by the pressure supply device DV2, which conveys volume into the brake circuit BK2 and via the redundant valves BP1 and BP2 into brake circuit BK1. Here, the pressure supply device DV2 may be a pump with continuous delivery action. If the brake system is poorly ventilated or if vapor bubbles develop, resulting in a greater volume requirement, this is detected by way of the known pressure volume characteristic curve (p-v characteristic curve), with the result that the pressure supply device DV2 already takes effect even at lower pressures. With regard to the pedal actuation, it must additionally be stated that this moves the piston Ko, which, by way of the pressure proportional to the pedal force, acts on the known travel simulator WS and thus determines the pedal characteristic. The travel simulator WS can commonly be shut off by means of a valve, in particular in the fall-back level in the case of failed pressure supply devices. In the case of redundant pressure supply devices, this is no longer relevant owing to the very low probability of failure.

The master brake cylinder HZ can be connected via the line 3 to the brake circuits BK1 or BK2, wherein the valve FV is arranged in the line 3 for the purposes of closing same. This connection is effective only in the fall-back level. If the line is connected to the connecting line of the two switching valves BP1 and BP2, the two valves BP1 and BP2 form a further redundancy. A conventional connection from the valve FV directly into one of the two brake circuits BK1, BK2 would, in the case of a leaking valve FV, have the result that the brake circuit and thus the pressure supply act on the master cylinder (HZ) piston, which conventionally leads to the pressure supply being shut off.

Various pressures or pressure levels from the master brake cylinder and from the brake circuits BK1 and BK2 act on the valve FV. In the worst case, this can have the result, for example in the event of failure of the on-board electrical system or of the open-loop and closed-loop control unit ECU, that an unfavorable pressure difference prevails at the closed valve FV and the valve FV cannot open, such that a pressure reduction $P_{reduction}$ is not possible. In order to prevent this, a further switching valve FVr is connected in parallel with respect to the valve FV, wherein the outputs and inputs of the valves FV and FVr are connected to the line 3 in an interchanged manner, such that, in the presence of any pressure differences, it is ensured that at least one of the two valves FV, FVr opens automatically, that is to say even without electrical energization, owing to the pressure difference. Furthermore, this advantageously reduces the back pressure on the valves.

In the event of failure of a brake circuit in the wheel cylinder, the corresponding inlet valve EV or switching valve SV is conventionally closed in order that the failed wheel circuit is eliminated. A leaking inlet valve EV/switching valve SV (dormant fault) causes the brake circuit or the entire pressure supply to fail. Here, too, the valves BP2 and BP1 provide additional safety, such that the pressure supply does not fail. A failure of the brake circuit BK1 owing to a nonfunctioning switching valve SV means a failure of the pressure supply DV1, whereby the pressure supply to all still-functioning wheel brakes is performed by means of the other pressure supply device DV2.

A further failure can result from a fault of the check valve RV1 in the second brake circuit. The failure of the pressure supply DV2 can be prevented here by means of a redundant check valve RV2. A throttle Dr downstream of the check valve RV2 with a small pressure flow allows diagnosis, for example by way of a pressure drop.

A central outlet valve ZAV is required for the closed-loop ABS control or for the pressure reduction with the second pressure supply device DV2. Here, the volume flow additionally passes via the valves BP1 or BP2, such that a leaking central outlet valve ZAV is not critical for normal operation because, in the event of failure of the central discharge valve ZAV, the pressure control is performed by means of pressure supply devices DV1 and DV2. Furthermore, the fault, even dormant, is identified by central outlet valve ZAV immediately from a change in pressure or increased volume delivery of the pressure supply device DV1. During normal braking up to approximately 120 bar, the pressure supply DV acts in both brake circuits BK via open valves BP1 and BP2. For extreme safety requirements, a redundant discharge valve ZAVr may also be installed in the line to the reservoir VB.

A pressure reduction without actuation of the pressure supply device DV1 is possible through control of the central outlet valve ZAV. With the valves BP1 and BP2 open, and with the valves SV open, the pressure in the wheel cylinders RB1, RB2, RB3 and RB4 can be reduced by opening of the central outlet valve ZAV. It is advantageous here to stop or reduce the delivery rate of the pressure supply device DV2. The pressure reduction gradients over time in the wheel cylinders RB1, RB2, RB2 and RB4 are determined here inter alia by the geometry of the central outlet valve ZAV. One possibility for influencing these pressure reduction gradients is offered by pulse width modulation, PWM, of the electrical voltage in the control of the valves BP1 and BP2. If the pressure reduction gradients in the wheel cylinders RB1 and RB2 are to be smaller than in the case of a fully open valve BP1, the valve BP1 is controlled with PWM, with the central outlet valve ZAV open, such that the pressure reduction gradients correspond or approximate to those of the setpoint values. Here, the quality of the closed-loop control of the pressure reduction can be improved with the pressure sensor DG2. Alternatively, the pressure reduction gradients in the wheel cylinders RB1 and RB2 can be set individually by PWM control of the valves SV in brake circuit BK1, with the valves BP1 and ZAV open. A similar situation applies to the pressure reduction gradients in the wheel cylinders RB3 and RB4. If the pressure reduction gradients in the wheel cylinders RB3 and RB4 are to be smaller than in the case of a fully open valve BP2, the valve BP2 is controlled with PWM of the electrical voltage, with the central outlet valve ZAV open, such that the pressure reduction gradients correspond or approximate to those of the setpoint values. Here, the quality of the closed-loop control of the pressure reduction can be improved with the pressure sensor DG. Alternatively, the pressure reduction gradients in the wheel cylinders RB3 and RB4 can be set individually by PWM control of the valves SV in brake circuit BK2, with the valves BP2 and ZAV open. In this way, very comfortable and quiet braking operations of the vehicle can be implemented, even without actuation of the pressure supply device DV1. If wheel-specific pressure reduction gradients in the wheel cylinders are required, for example in the case of torque vectoring during recuperation operation, then these can, with the central outlet valve ZAV open, be implemented using the known multiplex method with the PWM control of the valves BP1 and BP2 and by switching of the valves SV. A further possibility for realizing these wheel-specific pressure reduction gradients is offered by PWM in the switching valve (SV) control, with the valves BP1, BP2 and ZAV open. Simultaneous pressure reductions with individual pressure reduction gradients for each wheel cylinder RB1, RB2, RB3 and RB4 can thus be performed. As an alternative to the PWM control of the valves, closed-loop current control may also be used for the valve control.

Failures in the master brake cylinder HZ and travel simulator WS are normally caused by the seals. In the case of the master brake cylinder HZ, an additional seal D3 with a throttle may be used in the return line to the reservoir VB in order to be able to diagnose the failure of a seal at an early point in time. A leak can thus be identified by means of the pedal stroke sensors from a small additional pedal movement. The low loading in the case of SAD and FAD must be taken into consideration.

In many systems, for the diagnosis of the seals, a solenoid valve which is open when electrically deenergized is incorporated in the return line, which solenoid valve is closed for the purposes of diagnosis. In this case, pressure is conducted into the master brake cylinder HZ from the pressure supply device DV1 via the valves PD1, BP1 and EV. The diagnosis is performed by way of a pressure change at a constant piston position, or a change in the piston position at a constant pressure. As an alternative, a combination of throttle and check valve may also be used to save costs. The throttle is dimensioned such that a leakage flow through the seal leads to only a slight displacement of the pedal within a normal braking time of approximately 10 seconds.

The same solution is also used in the case of the travel simulator (WS) piston with redundant seal, with diagnosis, as above for seal D3, by way of the pedal movement. Furthermore, control of the brake boosting remains possible even with these failed seals, albeit with a changed pedal characteristic. Here, too, there is an extremely low failure rate for the failure of two seals, almost in the range of $<10^{-10}$/year. The pressure supply device DV1 may also be equipped with redundant seals, as described above in the case of the master brake cylinder HZ, with seal D6, with a throttle between seal D6 and seal D5. If the suction valve is connected directly to the connection on valve PD1, then the suction commences immediately with the return stroke of the piston, with the advantage that a high suction power is provided even at low temperatures. A failure or leakage of the switching valve SV causes failure of the pressure supply DV in limit cases. A compromise lies in the connection of the switching valve SV at approximately 60% of the stroke. This means that 40% of the stroke is possible without the effect of a leaking switching valve SV, and at the same time a suction action is possible in the normal temperature range. With the small restriction mentioned above, the volume delivery of the piston is ensured by redundancy. Furthermore, the motor may be controlled by means of a redundant 2×3-phase winding, such that the pressure supply devices DV fail only as a result of a blocking ball-screw drive KGT.

The ABS function by means of multiplex operation MUX and the pressure supply device DV1 is performed as described in WO 2006/111393 A1. Extended MUX functions result from a central discharge valve ZAV. If, during the pressure build-up $p_{build-up}$ in the brake circuit BK1, a pressure reduction $p_{reduction}$ is necessary at the same time in the other brake circuit BK2, this is performed by means of the central discharge valve ZAV and simultaneously closed valve BP1. In this way, the multiplex system MUX is subjected to load only by two wheel brakes RB1, RB2 in the brake circuit BK1, that is to say a pressure build-up $P_{build-up}$ and pressure reduction $P_{reduction}$ cannot take place in the wheel brakes RB1 and RB2 of the brake circuit BK1 simultaneously. Alternatively, a discharge valve AV1, AV2 in the respective brake circuit may also be used for the purposes of pressure reduction $P_{reduction}$ in order to relieve the MUX of load. Here, the discharge valve AV1, AV2 may be arranged or connected either between the switching valve SV and a connecting switching valve BP1, BP2 or else between the wheel brake and the associated switching valve SV, such that a direct pressure reduction $P_{reduction}$ can take place by dissipation via the discharge valve to a reservoir VB. This is expedient in particular for the pressure reduction $P_{reduction}$ in the front wheels. The central discharge valve ZAV is not required in this alternative.

The ABS function by means of the second pressure supply device DV2 is performed in a slightly restricted manner in this case, in particular no $P_{build-up}$ during $P_{reduction}$. Fully individual closed-loop ABS control is nevertheless possible. The infrequent use of the pressure supply device DV2 at pressures greater than 120 bar and in the event of failure of the first pressure supply device DV1 must be taken into consideration.

What is typical for the abovementioned MUX operation is the closed-loop pressure control, also in the case of ABS, by means of the volume measurement and by means of the piston movement of the pressure supply device DV1, also taking into consideration the pressure-volume characteristic curve (p-V characteristic curve). In the case of a simple eccentric piston pump, this can be performed not by way of the piston movement but by way of the delivery time=volume, with additional rotational speed measurement and, if necessary, pressure measurement. A metering of volume for the pressure build-up is thus also possible. Here, in the case of the pressure build-up $p_{build-up}$, a serial and non-simultaneous pressure build-up $p_{build-up}$ in the individual wheel brakes is advantageous. Here, the valve dimensioning and the back pressure on the valve must be taken into consideration, in particular in the case of the valves BP1 and BP2 in the case of rapid pressure build-up in the wheel circuits. The back pressure of the abovementioned valves acts as a pressure difference between the brake circuits BK1 and BK2. This can be reduced considerably if both pressure supply devices DV1 and DV2 are activated in this operating state. Here, a single-circuit gear pump is also expedient instead of a piston pump. Here, the pressure reduction $P_{reduction}$ and pressure build-up $p_{build-up}$ may also be performed by means of the gear pump. For this purpose, instead of the check valve RV, a valve MV (not shown) is required in the return line to the reservoir VB. Full MUX operation is thus also possible with the second pressure supply device DV2.

The open-loop and closed-loop control device ECU is a constituent part of the entire system and of the packaging. A redundant or partially redundant ECU is required for fail-safe functioning. This partially redundant ECU may also be used in addition to the redundant ECU for particular functions. In any case, the valves are or should be driven redundantly by means of separate valve drivers and isolation switches, which shut off a failed valve driver.

A redundant on-board electrical system connection is also necessary for the redundancy of the open-loop and closed-loop control device ECU. A connection with 48V may also be used for the connection of the motors. The advantage of 48V is higher dynamics. In the event of failure of the motor of the pressure supply device DV1 at 48V, emergency operation with 12V with approximately 50% power is realized with reduced dynamics and cost savings. For this purpose, a configuration of the motor for 24V, for example, is necessary.

A pressure transducer DG is preferably used in the brake circuit BK2, and possibly also in brake circuit BK1. In the event of failure of the pressure transducer, closed-loop pressure control can be performed by way of the current measurement of the motors and position control of the piston using the p-v characteristic curve.

Figure 1A:
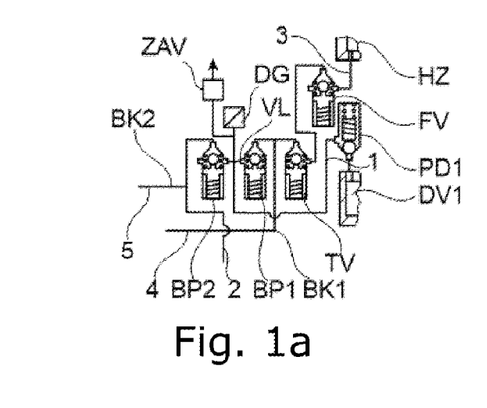
FIG. 1a: shows a variant of a possible valve circuit for the connection of the two brake circuits.
Figure 1B:
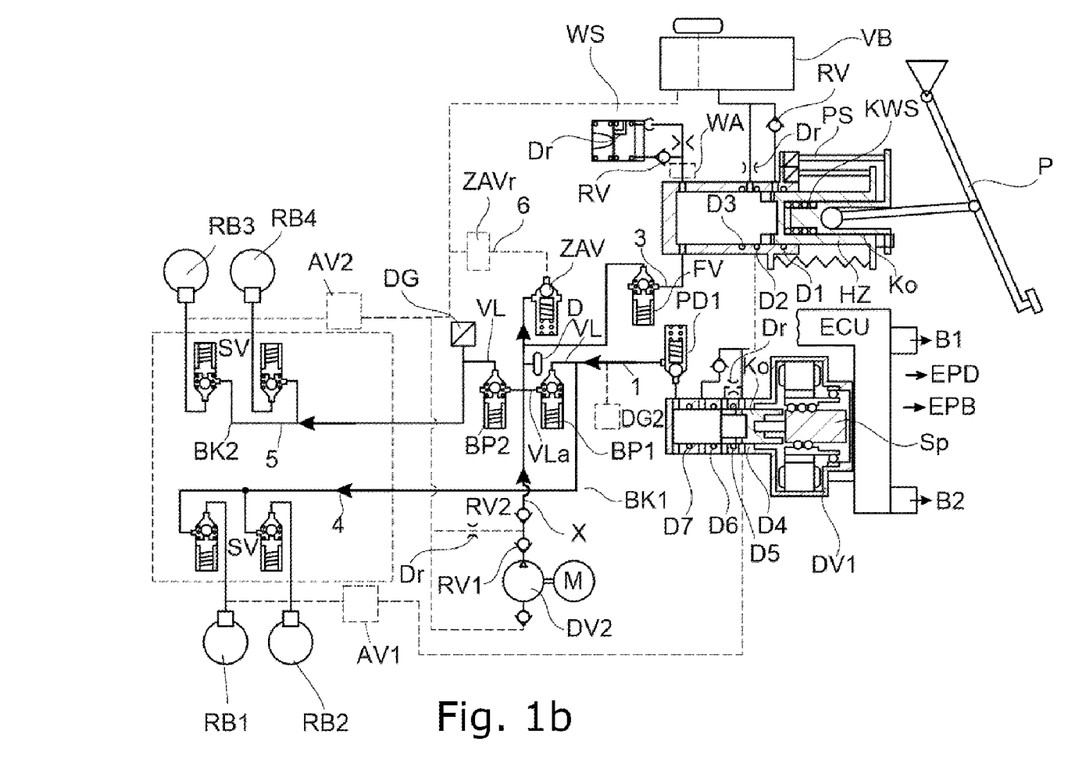
FIG. 1b: shows an alternative embodiment with a different connection of the second pressure supply device.

Alternatively, the hydraulic connection from the pressure supply device of the brake circuit BK2—as illustrated in FIG. 1b and denoted by X—to the inner connecting line VLa of the valves BP1 and BP2 may be realized. In this alternative, the pressure supply device DV2 no longer acts directly into the brake circuit BK2. This has an advantage in the event of failure of the valves BP2, SV and of the pressure supply device DV1. Here, the failure of pressure supply devices DV1 and DV2 can be avoided by virtue of pressure supply device DV2 acting into the brake circuit BK1 with valves BP2 and PD1 closed. However, triple faults with a minimum failure probability of approximately $<5 \cdot 10^{-18}$/year must be taken into consideration in relation to the failure of the wheel circuit of $<5 \cdot 10^{-6}$/year, that is to say 5 faults in one million vehicles per year. This is opposed by numerous disadvantages; for example, in the event of failure of the valve FV (for example leaking), the pressure supply in the brake circuit BK2 also fails.

In the pressure line of a pressure supply device DV1, DV2, there may be arranged a pressure relief valve ÜV1, ÜV2 for protecting the drive, in particular the spindle and/or the ball-screw drive, which pressure relief valve opens for example at approximately 120 bar.

FIG. 1a shows an expansion of the valve arrangement with an additional isolation valve TV as redundancy with respect to the valve FV. Here, the pressure supply device (DV) connection between valves BP1 and TV may be realized, with the result that a brake circuit BK1 with switching valve (SV) failure (extremely seldom, $<10^{-9}$/year) does not result in a failure of pressure supply device DV1. This is opposed by additional expenditure and safeguarding of the connection of brake circuit BK1 to brake circuit BK2 only by way of one BP valve.

The hydraulic connection of the valves from the outside and inside to the valve seat is also of great importance. In this case, consideration must be given to the fault situation in which, despite redundancy, the electrical connection to the valve coil, or the valve coil itself, fails. If the pressure is reduced in this case, also owing to failure of a component, the valve must open owing to the pressure difference. The pressure must not remain confined. For example, the FV valve can reduce pressure and release volume into the master brake cylinder HZ with low pressure when the driver releases the brake pedal. Without this measure, the vehicle would, after the braking operation, come to a standstill or continue to travel with the previously set pressure, which would lead to overheating of the brake and total failure. Despite the described redundant control of the valves, this extremely rare case must not occur and can be avoided. This is a further safety feature of the proposed solution. Accordingly, as illustrated in the figures, all valves are connected to the hydraulic lines such that they always open owing to the existing pressure difference, without electrical activation, during pressure reduction via the valves ZAV and DV1 or via the valve FV to the master brake cylinder HZ.

Alternatively, it is also possible, by means of a modified electromotive parking brake EPB, for the closed-loop ABS control to be performed by means of the pressure supply device DV1 or DV2 and the two connecting switching valves BP1 and BP2. Here, to form a redundancy, it is also possible for the motor of an electromotive parking brake EPB to be used, with relatively low dynamics, for the closed-loop ABS control. The hydraulic main lines 4, 5 are then connected to the electromotive parking brakes EPB.

Figure 1C:
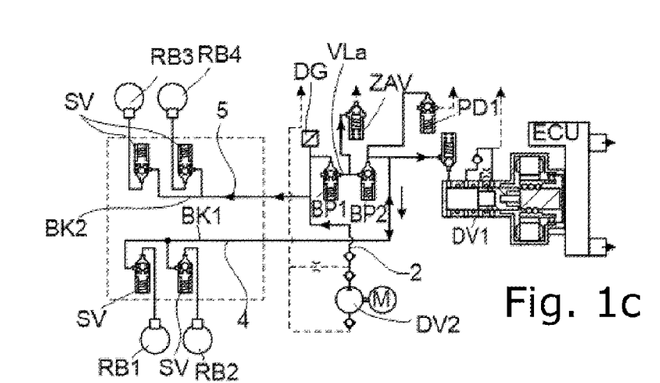
FIG. 1c: shows the function of the brake system with both pressure supply devices.

FIG. 1c shows the function of the pressure supply devices DV1 and DV2 during the pressure build-up $p_{build-up}$ and pressure reduction $P_{reduction}$. The piston of the pressure supply device DV1 generates the volume that passes into the brake circuit BK1 via the valve PD1 and into the brake circuit BK2 via valves BP1 and BP2. The pressure is measured by means of the pressure transducer DG. For the pressure reduction $P_{reduction}$, the piston moves back, with a corresponding backflow of the volume. In the case of higher pressures or failure of pressure supply device DV1, the pressure supply device DV2 takes effect and delivers the volume directly into brake circuit BK2 and via the valves BP2 and BP1 in brake circuit BK2; valve PD1 is closed. The pressure reduction $P_{reduction}$ can be performed by means of the pressure supply device DV1, wherein the volume of greater than 120 bar flows out via the breather hole. Alternatively, the pressure reduction $P_{reduction}$ may be performed via the central discharge valve ZAV. Here, too, the pressure measurement and closed-loop control is performed by means of the pressure transducer DG. In the event of failure of the pressure transducer DG, the current and travel measurement of the piston may also be used as a substitute signal.

A further advantage is the possibility of assisting the parking brake EPB during parking. One or both pressure supply devices DV1 and DV2 can be used to generate a preload in the parking brake, such that its electric motor can be configured to be reduced in terms of power and torque. Owing to redundant pressure supply devices, this use is sufficiently fail-safe.

Figure 1D:
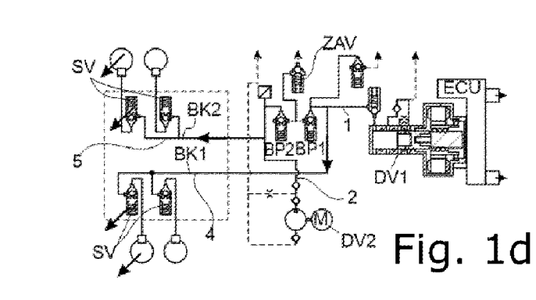
FIG. 1d: shows the function in the event of failure in one brake circuit and/or of the switching valve of one wheel brake.

FIG. 1d shows the effect of faults/failure. In the event of failure of the brake circuit BK1 in the wheel cylinder or feed line, the switching valve SV is closed. In the event of a double fault in the wheel brake and in the switching valve SV, brake circuit BK1 fails and pressure is generated in the brake circuit BK1 by means of the pressure supply device DV2. An analogous situation applies in the event of failure of a wheel brake RB and/or valve SV in the brake circuit BK2. Then, the pressure supply device DV1 generates the pressure in the brake circuit BK1. The safety function of the redundant valves BP1 and BP2 is of great importance here.

Figure 1E:
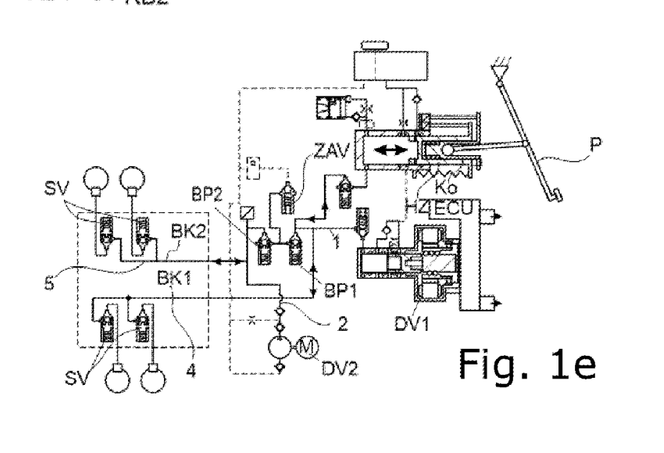
FIG. 1e: shows the function of the hydraulic system in the event of failure of both pressure supply devices.

FIG. 1e shows the effect in the event of failure of both pressure supply devices DV1 and DV2, for example in the event of an on-board electrical system failure. Here, the pressure is generated by means of the pedal actuation and piston. The volume passes via the valves FV, BP1 into brake circuit BK1 and valves FV, BP2 into brake circuit BK2 and travel simulator WS. Mention should be made of the fail-safe master brake cylinder HZ with the redundant seals, which has the potential to reduce the demands on the redundancy of the onboard electrical system in order to save costs. Here, a partial redundancy in the ECU may be used for various functions such as simplified closed-loop ABS control.

The embodiments show that, through logical use of redundancy with diagnosis of dormant faults in the event of leaks, exceptional fail safety is realized. The optimized valve arrangement results in less expenditure than in the case of a conventional and fail-safe system. Double faults with simultaneous occurrence are extremely rare, that is to say in the range of $10^{-9}$/year. In the case of extremely important double faults such as a brake circuit failure in the wheel brake or in the switching valve SV, even a total brake failure can be avoided, because one fully effective brake circuit is still available for the brake force boosting.

Figure 2:
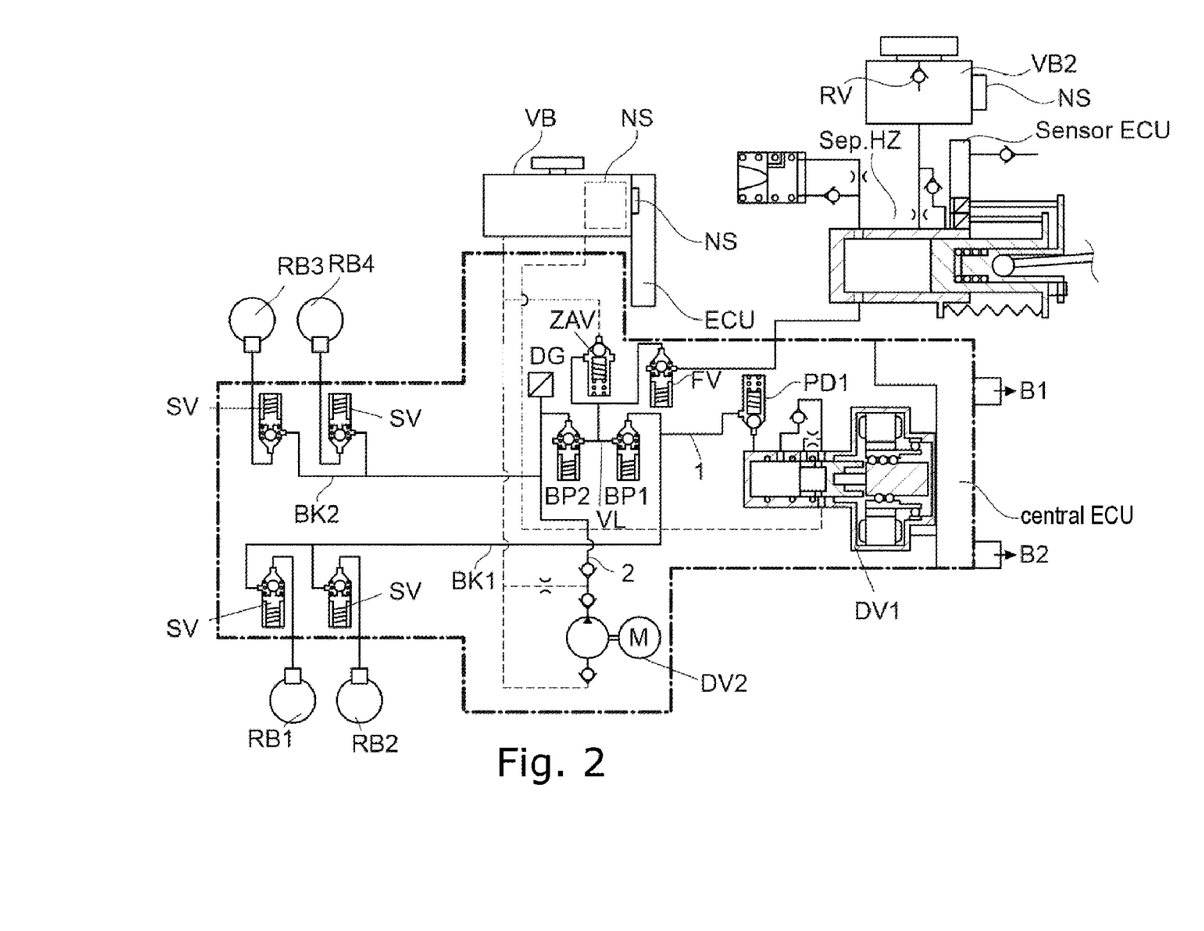
FIG. 2: shows the system with the master cylinder as a separate module.

FIG. 2 shows the possibility, mentioned in the introduction, of modular braking with a separate master brake cylinder HZ in relation to the main unit, which brings advantages in terms of installation and noise transmission to the bulkhead. A disadvantage is a separate reservoir, possibly with a level transducer and a small ECU for recording the sensor signals and transmitting the signals to the central ECU.

A further problem arises if, for the diagnosis of the master brake cylinder HZ, additional volume passes from the pressure supply device DV1 via the throttle into the reservoir VB2. The solution to this is diagnosis at a low pressure of <5 bar. In the case of the pressure measurement that is necessary for the diagnosis in any case, no pressure reduction is an indication that the reservoir VB is already full. Here, the cover of the reservoir VB has an integrated check valve RV. Furthermore, after the diagnosis, a certain volume is drawn out of the reservoir VB by the pressure supply DV. Thus, the additional level sensor NS can be omitted, and a diagnosis of the master cylinder HZ is possible.

Figure 3:
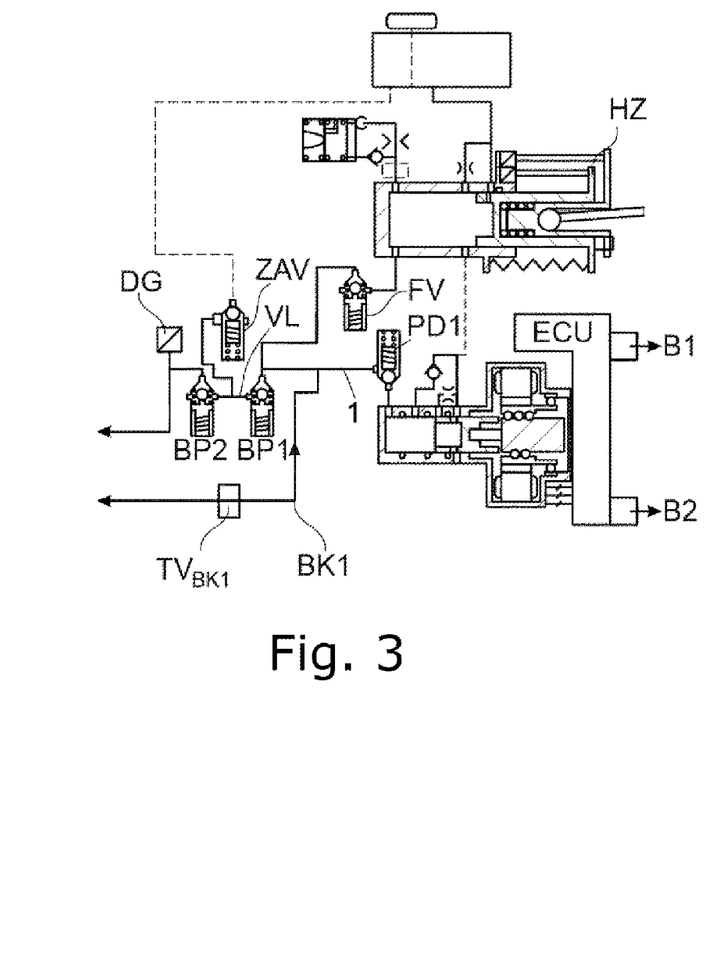
FIG. 3: shows a hydraulic system with only one pressure supply, which however has a redundant motor controller.
Figure 3A:
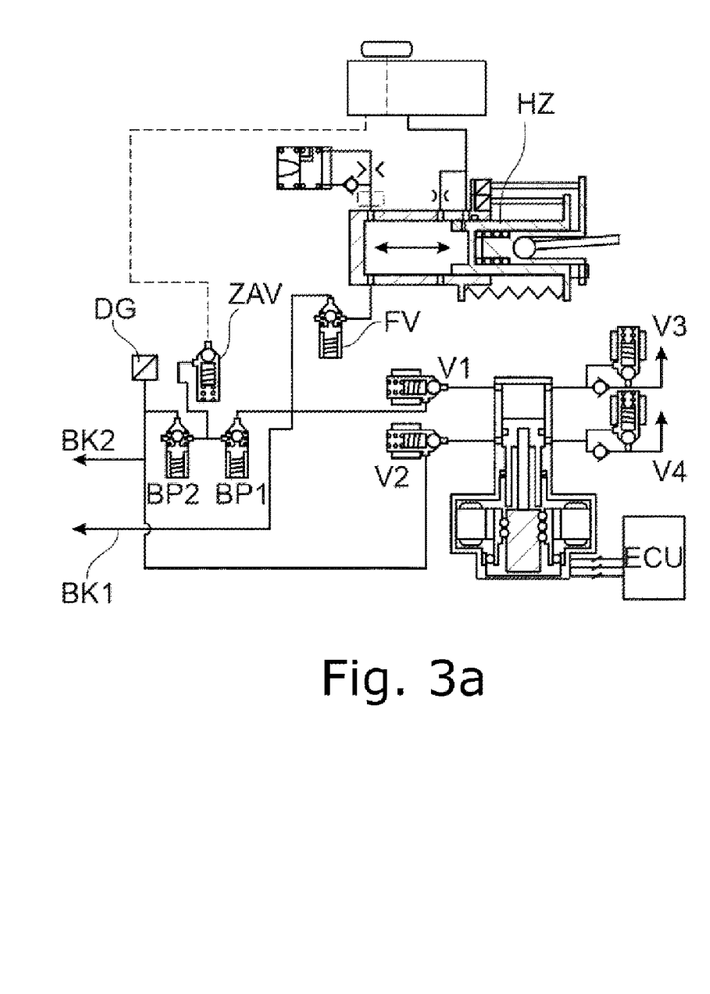
FIG. 3a: shows the hydraulic system as per FIG. 3, but with a pressure supply device with double-action piston.

FIGS. 3 and 3a show the use of the valve circuit in the case of only one pressure supply device DV1. The piston with redundant seals, as described in FIG. 1, is suitable for this purpose. Furthermore, as is known, the motor control may be performed by means of 2×3 phases. This requirement can meet the lower requirements of level 3. The motor and drive must be designed for pressures higher than 120 bar. To avoid the effect of double faults of brake circuit BK1 and switching valve SV, an isolation valve TV may also be used here in brake circuit BK1. This solution is primarily suitable for smaller vehicles. The hydraulic lines 4, 5 of the two brake circuits BK1 and BK2 may be connected to the pressure supplies DV1 and DV2 and wheel brakes RB1-4 by means of different valve circuits, for example according to FIG. 1 with multiplex operation or individual conventional closed-loop wheel control with inlet and outlet valve for each wheel brake.

FIG. 3a shows the application of the 2-circuit double-action piston, the forward stroke of which feeds brake circuit BK1 via valve V1, and the return stroke via brake circuit BK2. Both circuits of the double-action piston can be fed into the second brake circuit BK via valves BP1 and BP2. As is known from WO2016/023994 A1 and WO2016/023995 A1, the volume of the double-action piston must, for the $P_{reduction}$, be discharged via valves V3 and V4 in the reservoir VB.

Figure 4:
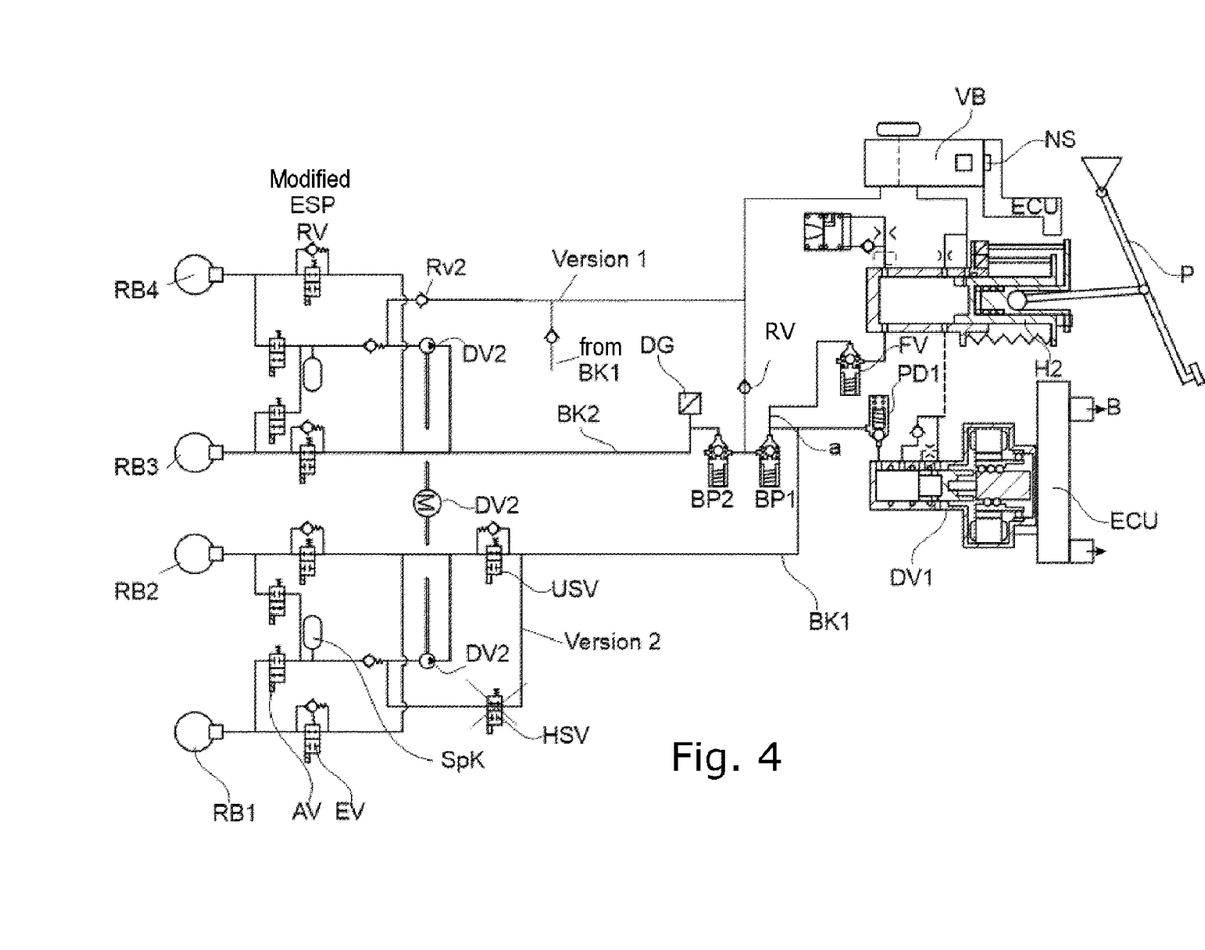
FIG. 4: shows a valve arrangement for E/X boost in combination with ESP.

FIG. 4 shows two possible versions 1 and 2 of valve arrangements for an E/X boost in combination with ESP. Here, with a modified valve circuit according to FIG. 1, the additional valves for ESP can be omitted, such that the valve arrangement corresponds to that of the ABS with inlet valve EV and outlet valve AV and storage chamber SpK, whereby lower costs and lower weight in relation to the ESP valve arrangement are achieved. In version 1, the pressure supply device DV1 delivers the volume via the valves BP1 and BP2 into the brake circuits BK1 and BK2. In the event of failure, volume is drawn in no longer via the E/X boost but directly via the check valve RV2 from the reservoir with level sensor NS, which is advantageous for operating situations for the various functions because lower suction losses arise in relation to sleeves with additional shutting-off of the travel simulator, by virtue of the fact that the master brake cylinder delivers the replenishment volume. In version 2, the valve USV remains, whereas the valve HSV can be omitted by virtue of the fact that drawing-in is performed via the suction valve via valves BP1 and BP2. Here, the valve HSV is closed.

All functions such as brake circuit (BK) failure or switching valve (SV) (inlet valve (EV)) failure correspond to the description in FIG. 1 with the advantages presented. The position of the pressure transducer DG, in this case in brake circuit BK2, may be varied. The connection from valve FV to valves BP1 and BP2 may also take place directly to valve BP1, without redundancy (see dashed lines).

This system not only has cost and weight advantages but also offers an improvement in the level of fail safety, inter alia by way of level measurement in the reservoir in the event of a leak in the system. This sensor should also be of redundant design, which is easy to implement if the ECU lies against the reservoir, in which the sensor elements can be arranged on the circuit board.

Ultimately, this valve arrangement can be used for an E/X boost. Advantages: less expenditure on valves, lower costs and lower weight, with the advantages of increased fail safety.

With this fail-safe valve arrangement, the number of valves can be reduced by approximately 40% in relation to a valve arrangement of known integrated 1-box systems, which, with higher expenditure on valves, are not fail-safe.

The pressure supply devices DV1 and DV2 may be used not only for the pressure supply for the ABS and/or ESP function but also for the control of the recuperation and torque vectoring.

Figure 5:
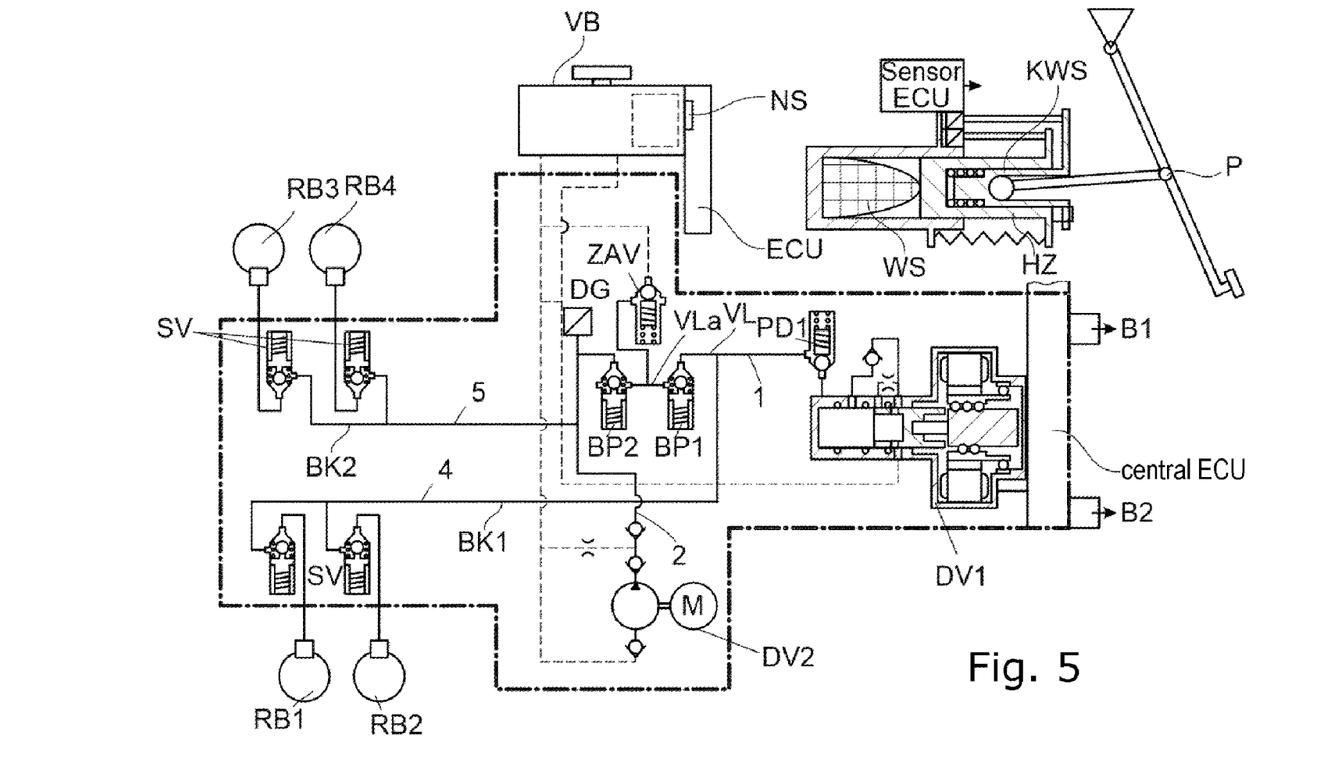
FIG. 5: shows a brake system with an electric pedal.

FIG. 5 shows the pressure supply devices DV1 and DV2 with valve arrangement. Here, an electric brake pedal, a so-called electric pedal, with travel simulator (WS) pedal travel sensors with a small sensor ECU and force-travel sensor KWS without a hydraulically acting master brake cylinder HZ are combined in one unit. This has advantages if the installation volume in the engine compartment is small or the noise requirements are high. Instead of the master cylinder HZ with reservoir VB (not shown in FIG. 5), the arrangement with pedal actuation with travel simulator WS, so-called electric pedal, may also be used. The signals of the pedal travel sensors are processed in a sensor ECU and fed to the central ECU. For level 5, a brake switch may also be used as an alternative to the electric pedal.

The abovementioned unit has the 2-circuit reservoir VB with float and level sensor NS, which may be integrated in the central open-loop and closed-loop control unit ECU. This level sensor NS should likewise be of redundant configuration and continuously measure the level, because a loss of volume owing to a leak is quickly detected in this way. Since, in this case, the connection to the master brake cylinder HZ is omitted, and thus the fall-back level with respect to the master brake cylinder HZ in the event of the failure of both pressure supply devices DV1 and DV2 and/or of the on-board electrical system is also omitted, the valves BP1 and BP2 are preferably designed as valves which are open when electrically deenergized.

LIST OF REFERENCE DESIGNATIONS 1-11 Hydraulic lines
BK1 Brake circuit 1
BK2 Brake circuit 2
HZ Master cylinder
BP1 Bypass valve 1 (SO) or connecting switching valve
BP2 Bypass valve 2 (SO) or connecting switching valve
VB Reservoir
WS Travel simulator
WA Travel simulator shut-off valve
ECU Electrical control unit
DV Pressure supply
DG Pressure transducer
D1-D7 Seals
AV1, AV2 Outlet valves (SG)
ZAV Central outlet valve (SG)
SV Switching valve (SO)
RZ Wheel cylinder
RB1-RB4 Wheel brakes
NV Level transducer
PD1 Switching valve (SG)
SO Open when electrically deenergized
SG Closed when electrically deenergized
RV Check valve
KWS Force-travel measuring element
Sp Spindle with ball-screw drive KGT
Ko Piston
Dr Throttle
D Damper element
PS Pedal travel sensors
P Pedal actuation
NS Level sensor
TV Isolation valve
V1-V4 Valves of the double-action piston
VL Hydraulic connecting line for connecting the two brake circuits BK1 and BK2
VLa Inner connecting line for connecting the two connecting switching valves BP1 and BP2
ÜV1, ÜV2 Pressure relief valve

What is claimed is:

1. A brake system for a vehicle, comprising the following components:
   two hydraulic brake circuits each with at least one hydraulically acting wheel brake,
   a first pressure supply device arranged to supply pressure to the wheel brakes, wherein the first pressure supply device, by back and forth movement of a piston, is able to build up and to reduce pressure in at least one of the two hydraulic brake circuits,
   a second pressure supply device with a pump with continuous delivery action, in the form of a piston pump, gear pump or eccentric piston pump, which is driven by an electromotive drive, and which is arranged to build up pressure in at least one of the two hydraulic brake circuits,
   at least one valve arrangement with valves for wheel-specific setting of brake pressures and/or for isolation of the wheel brakes from or connection of the wheel brakes to at least one of the first or second pressure supply devices,
   at least one electronic open-loop and closed-loop control unit, and
   a hydraulic connecting line arranged to connect the two brake circuits,
   wherein each wheel brake is assigned one dedicated switching valve of the at least one valve arrangement, and wherein each of the two hydraulic brake circuits has a hydraulic main line, via which the switching valves are connectable to each of the first and second pressure supply devices,
   wherein two of the wheel brakes are directly connected via their assigned dedicated switching valves to a first one of the hydraulic main lines and two of the wheel brakes are directly connected via their assigned dedicated switching valves to a second one of the hydraulic main lines,
   wherein at least one outlet valve of the at least one valve arrangement is provided for pressure reduction by dissipation into a reservoir, and
   wherein the first and the second pressure supply devices are configured for different maximum pressures or pressure levels, and
   wherein the brake system further comprises:
      an electric brake pedal with a travel simulator and with driver demand detection using one or more sensors and a sensor electronic control unit, or
      a master brake piston-cylinder unit actuable by a brake pedal, wherein the master brake piston-cylinder unit includes only one piston and one pressure chamber, wherein the one pressure chamber is connected to a travel simulator and is connectable to at least one of the two hydraulic brake circuits via a hydraulic line, and wherein at least one controlled valve of the at least one valve arrangement is arranged to shut off the hydraulic line.

2. The brake system as claimed in claim 1, wherein the second pressure supply device is connected to the reservoir via a check valve closing toward the reservoir.

3. The brake system as claimed in claim 1, wherein the first pressure supply device has a maximum pressure which corresponds to 40-70% of the maximum pressure of the second pressure supply device.

4. The brake system as claimed in claim 1, wherein the second pressure supply device assists the first pressure supply device in case of rapid pressure build-up or a pressure build-up above the maximum pressure of the first pressure supply device, and/or provides pressure in cases of fading or for an anti-lock brake system (ABS) function, and wherein in case of failure of the first pressure supply device, the second pressure device jointly performs the functions of the first pressure supply device.

5. The brake system as claimed in claim 1, wherein a motor of the first pressure supply device has two winding systems, each with three phases, and wherein control electronics of the motor are of redundant configuration such that, in case of failure of one of the winding systems or partial failure of the control electronics, the motor is still able to be operated with reduced power or lower torque in comparison with normal operation.

6. The brake system as claimed in claim 1, wherein the second pressure supply device delivers hydraulic medium directly into a first brake circuit of the two hydraulic brake circuits without interposed switching valves and is connectable to a second one of the two hydraulic brake circuits via multiple connecting switching valves.

7. The brake system as claimed in claim 6, wherein, in an ABS function, pressure reduction is performed in one of the two hydraulic brake circuits or in both of the two hydraulic brake circuits either using one of the first or second pressure supply devices, or using a central outlet valve, or using at least one outlet valve arranged between the assigned dedicated switching valve of one of the wheel brakes and one of the connecting switching valves or between one of the wheel brakes and the associated switching valve of the one of the wheel brakes.

8. The brake system as claimed in claim 1, wherein the second pressure supply device is an electrically driven single-circuit piston pump with a brush-type motor or a gear pump with a brush-type motor.

9. The brake system as claimed in claim 1, wherein both of the first and second pressure supply devices are combined in one structural unit, wherein an axis of a piston-cylinder unit of the first pressure supply device is oriented perpendicularly with respect to an axis of the second pressure supply device.

10. The brake system as claimed in claim 1, wherein a drive motor of the second pressure supply device is a brush-type motor, and wherein a delivery volume for controlling pressure build-up is determined from rotational speed and time and/or rotational angle.

11. The brake system as claimed in claim 1, wherein the master brake piston-cylinder unit has a dedicated reservoir.

12. The brake system as claimed in claim 1, wherein the electric brake pedal is provided, and wherein control signals thereof are input signals for the electronic open-loop and closed-loop control unit, further wherein the electronic open-loop and closed-loop control unit is of partially or fully redundant configuration with two supply connections.

13. The brake system as claimed in claim 1, wherein at least one of the first or second pressure supply devices serves for a pressure build-up or a closed-loop pressure control in a parking brake.

14. The brake system as claimed in claim 1, comprising exactly one pressure transducer.

15. The brake system as claimed in claim 6, wherein the exactly one pressure transducer is configured to be used for closed-loop pressure control for both the first pressure supply device and the second pressure supply device.

16. The brake system as claimed in claim 1, wherein one or more of the wheel brakes are not connected to their corresponding hydraulic main lines via a check valve.

17. The brake system as claimed in claim 1, wherein the at least one valve arrangement is configured such that one or more of the dedicated switching valves, when de-energized, is enabled to be opened by residual pressure in the corresponding one or more wheel brakes.

18. The brake system as claimed in claim 1, wherein one or more of the dedicated switching valves connect via their valve seats to the corresponding one or more wheel brakes.

19. The brake system as claimed in claim 1, wherein there is only one outlet valve, which is a central outlet valve.

20. The brake system as claimed in claim 1, wherein the hydraulic connecting line arranged to connect the two brake circuits has two connecting switching valves disposed therein.

21. The brake system as claimed in claim 20, wherein the at least one outlet valve is a central outlet valve that connects between the two connecting switching valves to the hydraulic connecting line arranged to connect the two brake circuits.

* * * * *